(12) United States Patent
Hays et al.

(10) Patent No.: US 6,678,751 B1
(45) Date of Patent: Jan. 13, 2004

(54) SYSTEM FOR SETTING FRAME AND PROTOCOL FOR TRANSMISSION IN A UART DEVICE

(75) Inventors: Paul J. Hays, Lafayette, CO (US); William M. Mansfield, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/569,657

(22) Filed: May 12, 2000

Related U.S. Application Data (60) Provisional application No. 60/159,725, filed on Oct. 15, 1999.

(51) Int. Cl.[7] .................. G06F 13/14; G06F 13/20; G06F 13/38; G06F 13/42
(52) U.S. Cl. .............. 710/8; 710/14; 710/33; 710/60; 709/217; 709/227; 709/228
(58) Field of Search .................. 710/8, 14, 33, 710/60; 709/217, 227, 228

(56) References Cited

U.S. PATENT DOCUMENTS

| | | | | |
|---|---|---|---|---|
| 3,747,074 A | * | 7/1973 | Schulze | 370/252 |
| 5,490,209 A | | 2/1996 | Kennedy et al. | |
| 5,674,003 A | * | 10/1997 | Andersen et al. | 348/14.08 |
| 5,684,472 A | | 11/1997 | Bane | |
| 5,923,705 A | * | 7/1999 | Willkie et al. | 375/219 |
| 5,938,731 A | * | 8/1999 | Schreiter | 709/227 |
| 5,974,055 A | * | 10/1999 | Imanishi | 341/100 |
| 6,052,737 A | * | 4/2000 | Bitton et al. | 709/228 |
| 6,163,586 A | * | 12/2000 | Hongbin Hao et al. | 375/225 |

FOREIGN PATENT DOCUMENTS

EP   0 918 421 A1   5/1999

OTHER PUBLICATIONS

Wegener, Albert W., Practical Techniques for Baud Rate Estimation, Article, Mar. 23, 1992, pp. IV–681 through IV–684, 0–7803–0532–9/92, Studer Editech Corporation, Menlo Park, CA, , U.S.A.

* cited by examiner

Primary Examiner—Rehana Perveen
(74) Attorney, Agent, or Firm—Duft Setter Ollila & Bornsen (57) ABSTRACT

A system for setting baud rate and communication protocol in a remote device. In this invention, the remote device receives samples of signals from a host device in a buffer. The remote device then detects a baud rate of said signals from the samples. A protocol being used by the host device to communicate is also determined from the samples. The remote device is then set to communicate using the determined protocol at the detected baud rate.

21 Claims, 6 Drawing Sheets

SYSTEM FOR SETTING FRAME AND PROTOCOL FOR TRANSMISSION IN A UART DEVICE

CROSS REFERENCED AND RELATED APPLICATIONS

This is a non-provisional application claiming priority to Provisional Application Serial No. 60/159,725 filed Oct. 15, 1999 which incorporated by reference as if set forth below.

FIELD OF THE INVENTION

This invention relates to communications between electronic devices. More particularly, this invention relates to a system that a first device uses to determine the baud rate and protocol that a second device uses to communicate with the first device and that sets the first device to the used baud rate and protocol. Still more particularly, this invention relates to a system in a first UART device for determining a baud rate, frame and protocol that a second UART device uses to communicate and for setting the first device to communicate at the determined baud rate, frame and protocol.

Problem

In the process control industry, it is common for multiple electronic devices to communicate the share data. The electronic devices must share data to provide control functions in a process. For example, a first electronic device may measure the flow of a material through a pipeline and a second device may control a valve which regulates the flow of material. In order to regulate the flow of material, the first device must transfer flow rate data to the second device which in turn opens and closes the valve to regulate the flow of material.

It is a problem that different devices may communicate using different baud rates and different protocols. For the present discussion, frame types, baud rate, framing, and protocols are referred to as "Protocol Parameters." For purposes of this discussion, the baud rate is the amount of bits per unit of time that are transferred by a device. The frame type is the manner in which message packets are formatted to transfer data between two devices. The protocol is the manner in which groups of message packets are organized along with "when" devices may send/receive packets in order to transfer data between two devices. If two devices do not communicate using the same Protocol Parameters, a first device will not receive correct data from the second device.

To facilitate communication between devices, most devices include a Universal Asynchronous Receiver Transmitter (UART). A UART is an interface that provides communication between devices. In control devices, protocols such as Modbus use UARTS to communicate. UARTs may also communicate at any one of a number of baud rates and framing types. In the past, if it were possible that a first device could be connected to other devices that communicate at one of any number of "protocol/UART parameters," the first device had to be programmed manually to communicate with the proper "protocol/UART parameters." This requires the user to properly program the UART in order for the device communicate with another device.

The ability to make a device that is capable of communicating with many different devices using different Protocol Parameters is a particular problem for makers of Coriolis flowmeters. A Coriolis mass flowmeter measures mass flow and other information of materials flowing through a pipeline in the manner described by U.S. Pat. No. 4,491,025 issued to J. E. Smith, et al. of Jan. 1, 1985 and Re. 31,450 to J. E. Smith of Feb. 11, 1982. A Coriolis mass flowmeter has one or more flow tubes of a curved or straight configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a vibrational force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at two different points on the flow tube to produce sinusoidal signals representative of the motion of the flow tube at the two points. A phase difference of the two signals received from the sensors is calculated in units of time. The phase difference between the two sensor signals is proportional to the mass flow rate of the material flowing through the flow tube or flow tubes.

The sensors transmit the sinusoidal signals to a signal conditioner. The signal conditioner generates parameter signals that indicate properties of the material flowing through the flowmeter. The signal conditioner also generates a drive signal applied to the driver to vibrate the flow tubes. The parameter signals are then transmitted to a host system which provides the desired properties to a user.

Different host systems may transfer data in one of several Protocol Parameters. The signal conditioner must be able to recognize the Protocol Parameters used by the host system to communicate. The signal conditioner must then be configured to communicate in the recognized Protocol Parameters to communicate with the host system. Therefore, the makers of Coriolis Flowmeters desire a system that would allow a signal conditioner to communicate with different types of host systems without the need of manual programming.

Solution

The above and other problems are solved and an advance in the art is made by a system for setting Protocol Parameters for transmission in a device in accordance with this invention. One advantage of a system in accordance with this invention is that a device automatically determines the Protocol Parameters being used and sets communication in the determined Protocol Parameters being used. This eliminates reliance on a user to set the communication Protocol Parameters properly for each device making communication more reliable. Furthermore, a system in accordance with the present invention makes the determination of protocol parameters being used without losing data and without the use of special frames. Therefore, existing devices devices may communicate with a device implementing a system in accordance with this invention without modification.

A first or remote device executing the system in accordance with this invention has a processing unit connected to a bus that connects the remote device to a second or host device. A remote device is a device that provides a service or data to a host device to allow the host device to perform a function. A host device is a device that determines the Protocol Parameters used to transmit data, receives data from the remote device and performs a control function using the received data.

When the first device is connected to the second device, the second device transmits signals indicating data to the first device. In accordance with this invention, the first device receives the signals. The baud rate of bits in the received signals is detected by the first device. The protocol and framing of the bits received is then determined by the first device. The first device is then set to communicate in the determined Protocol Parameters.

One manner in which the baud rate may be detected is by determining whether a level transition between two bits is received in a predetermined number of samples. If the transition bit is not detected in a certain number of samples, then the system may determine the baud rate is less than or equal to n divided by 8. One manner in which the system may determine whether a transition occurs is by template matching.

If the transition bit is not received in a certain number of samples, the first device determines that the baud rate must be between n and n/4. Therefore, template matching may be performed for, patterns of protocols and framing for baud rates between n and n/4.

Template matching is performed in the following manner in accordance with the present invention. The first device reads one of a plurality of templates for Protocol Parameters supported by the first device. The samples received are then read from a buffer. The read template is then compared to the read samples. When a template matches the samples, the first device is set to communicate at the Protocol Parameters of the template.

A first aspect of this invention is a method for a remote device to establish communication with a host device in the following manner. The remote device receives samples of signals from the host device. A baud rate of the signals from is detected by the remote device from the samples. The remote device then determines from the samples a protocol and framing being used by the host device to communicate. The remote device is then set to communicate with the host device using the determined Protocol Parameters.

A second aspect of this invention is that baud rate is detected by determining whether a level transition occurs between two bits received within a certain number of samples.

A third aspect of this invention is adjusting a sample rate responsive to the level transition between two bits not being received within the certain number of samples.

A fourth aspect of this invention is that the baud rate is determined to be less than or equal to n divided by 8 responsive to a determination that the level transition between two bits is not received within the certain number of samples.

A fifth aspect of this invention is performing protocol template matching for baud rates of n divided 8 and less responsive to a determination that the baud rate is less than or equal to n divided by 8.

A sixth aspect of this invention is that the baud rate is determined to be between n and n/4 responsive to a determination that the level transition between two bits is not received within the certain number of samples.

A seventh aspect of this invention is that the determination of the protocol and framing may be completed by performing protocol template matching for each supported baud rate between n and n/4 in response to a determination that the baud rate is between n and n/4.

An eighth aspect of this invention is that a determination of the protocol and framing may be completed by performing protocol template matching between the samples and templates of known bits in supported protocols.

A ninth aspect of this invention is that the performing of protocol template matching may be done in the following manner. The remote device reads one of a plurality of protocol templates and then reads the samples of the signals. The samples and template are compared and the remote device determines the signals are being transmitted in a protocol of the one of said plurality of protocol templates responsive to a match of the one of said plurality of protocol templates and the samples of the signals.

DESCRIPTION OF THE DRAWINGS

This invention can be understood from reading the Detailed Description given below and the following drawings.

DETAILED DESCRIPTION

Figure 1:
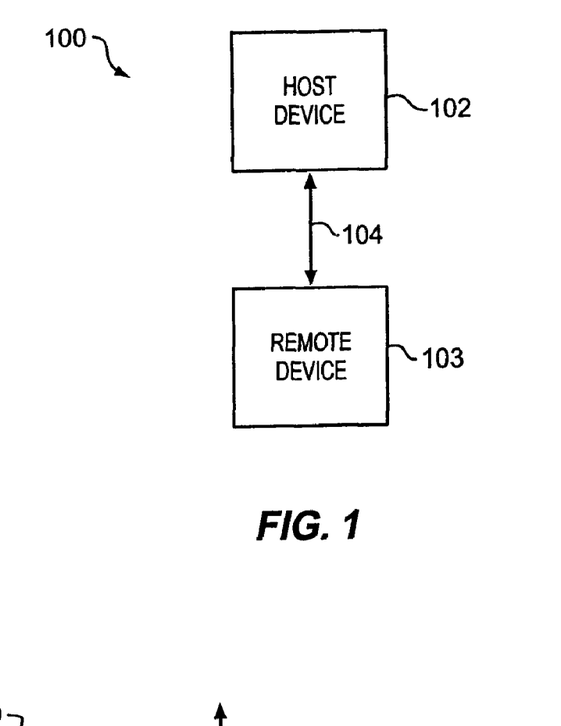
FIG. 1 illustrating a system having a host system connected to a remote system that preforms the setting of Protocol Parameters in accordance with the present invention.

FIG. 1 illustrates a system 100 in which processes in accordance with the present invention are used to provide communication between devices. In system 100, host device 102 is connected to remote device 103 via path 104. For purposes of this discussion, a remote device 103 is a device that provides a service or data to a host device to allow the host device to perform a function. A host device 102 is a device that sets the Protocol Parameters used to transmit data, receives data from the remote device and performs a control function using the received data. Furthermore, host device 102 is a device that is programmed to communicate at a predetermined Protocol Parameters and remote device 103 is a device that must use the processes in accordance with this invention to set the Protocol Parameters in order to communicate with the host device.

Figure 2:
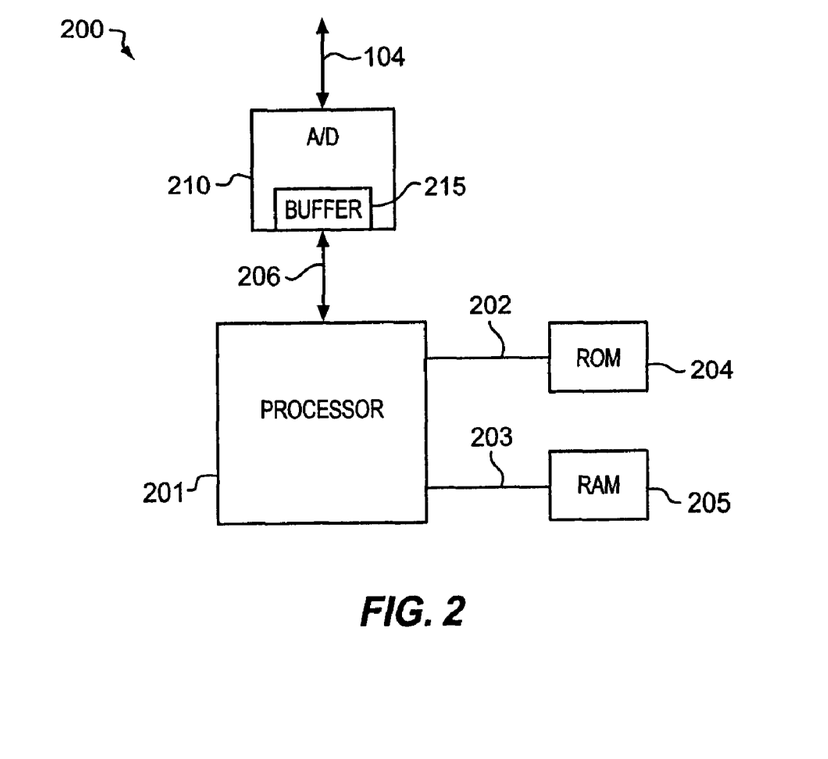
FIG. 2 illustrating an exemplary processing unit that may be executing functions in the host system and the remote system.

FIG. 2 illustrates an exemplary data processing system 200. In this invention both host device 102 and remote device 103 may include a data processing system 200 to perform functions including processes for communication between the devices. Data processing system 200 includes a processing unit 201. Processing unit 201 may be a processor, a microprocessor, or grouping of microprocessors and processors, that perform instructions stored in a memory.

A non-volatile memory such as Read Only Memory (ROM) 204 may be connected to processing unit 201 via path 202. ROM 204 stores instructions needed by processing unit 202 to operate data processing system 200. A volatile memory such as Random Access Memory (RAM) 205 may be connected to processing unit 201 via path 203. RAM 205 stores instructions and data needed by processing unit 201 to execute processes performed by data processing system 200. One skilled in the art will recognize that paths 202 and 203 may include a common memory bus or an I/O bus.

Processing unit 201 is connected to path 104 via path 206. Path 206 may include an Analog to Digital interface 210 if path 104 carries analog communications. Interface 210 may be a communication interface that includes a buffer 215 that stores digital signals as the signals are received over path 104. The signals are then read by processing unit 201 via path 206.

This invention relates to a process for a remote device to determine the Protocol Parameters which a host device is using to communicate. In one embodiment, the host device and remote devices are UART devices. The UART device may communicate in any one of these common baud rates: 300,600,1200, 2400, 4800, 9600, 14400, 19200, 28800, 38400, 57600, 76800, or 115200. One skilled in the art will recognize that these are only common baud rates and other rates may be used. Two typical protocols that can be used are Modbus ASCII and Modbus RTU, although other protocols such as HART may also be used.

Figure 3:
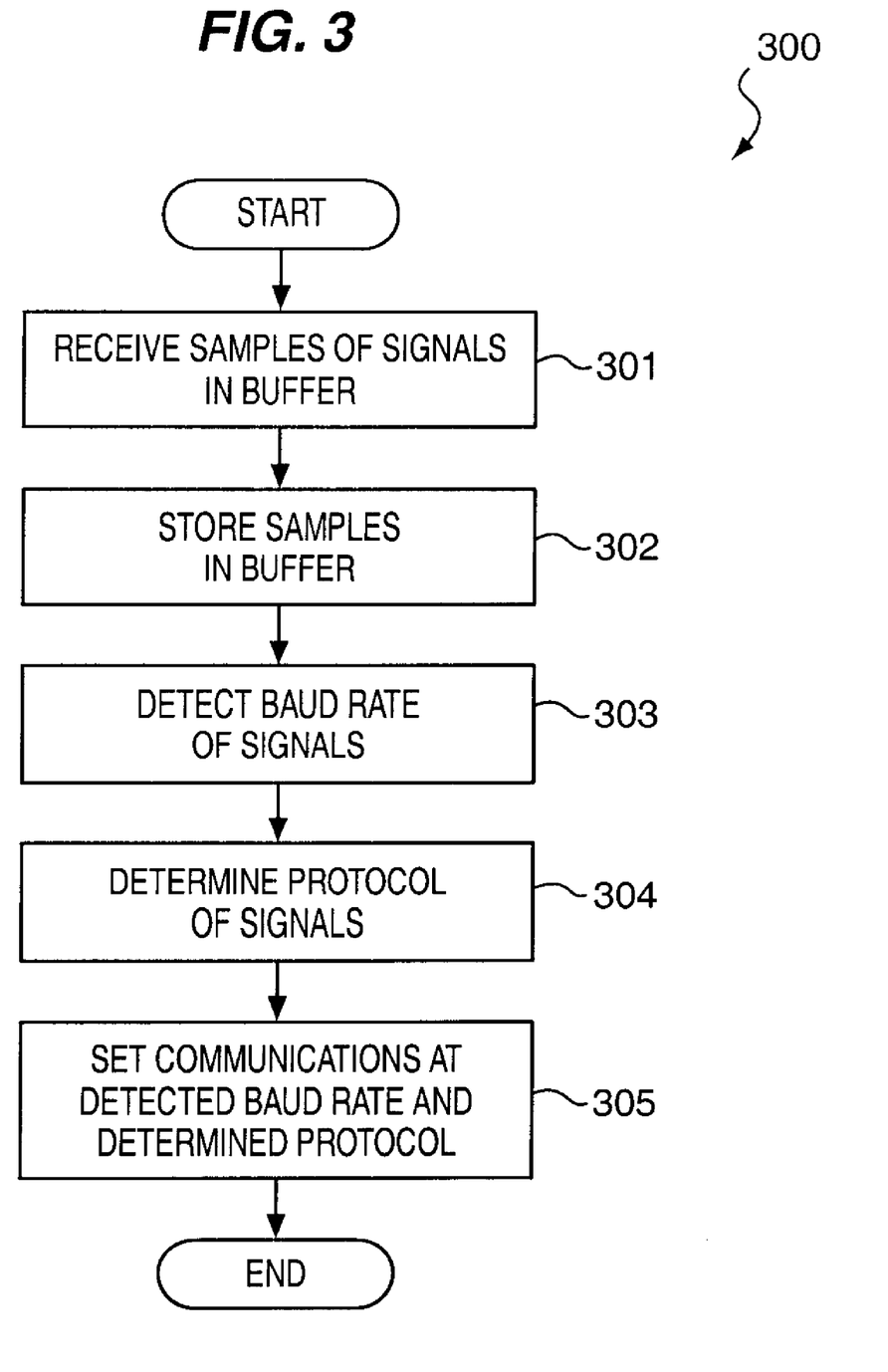
FIG. 3 illustrating a process for setting the Protocol parameters for communication in a remote device in accordance with the present invention.

FIG. 3 illustrates the process 300 executed by a remote device to set the Protocol Parameters the remote device uses to communicate with a host device. Process 300 begins in step 301 with the remote device receiving signals from a host device. The signals are stored in a buffer in step 302. The buffer may be registers in a processor or a buffer in an interface such buffer 215 shown in FIG. 2. In step 303, the remote device detects the baud rate from the signals stored in the buffer. After the baud rate is determined, the remote device determines the protocol and framing in which the signals are sent in step 304. The remote device then sets communications in the Protocol Parameters that the remote device has detected from the signals in the buffer in step 305 and process 300 ends.

Figure 4:
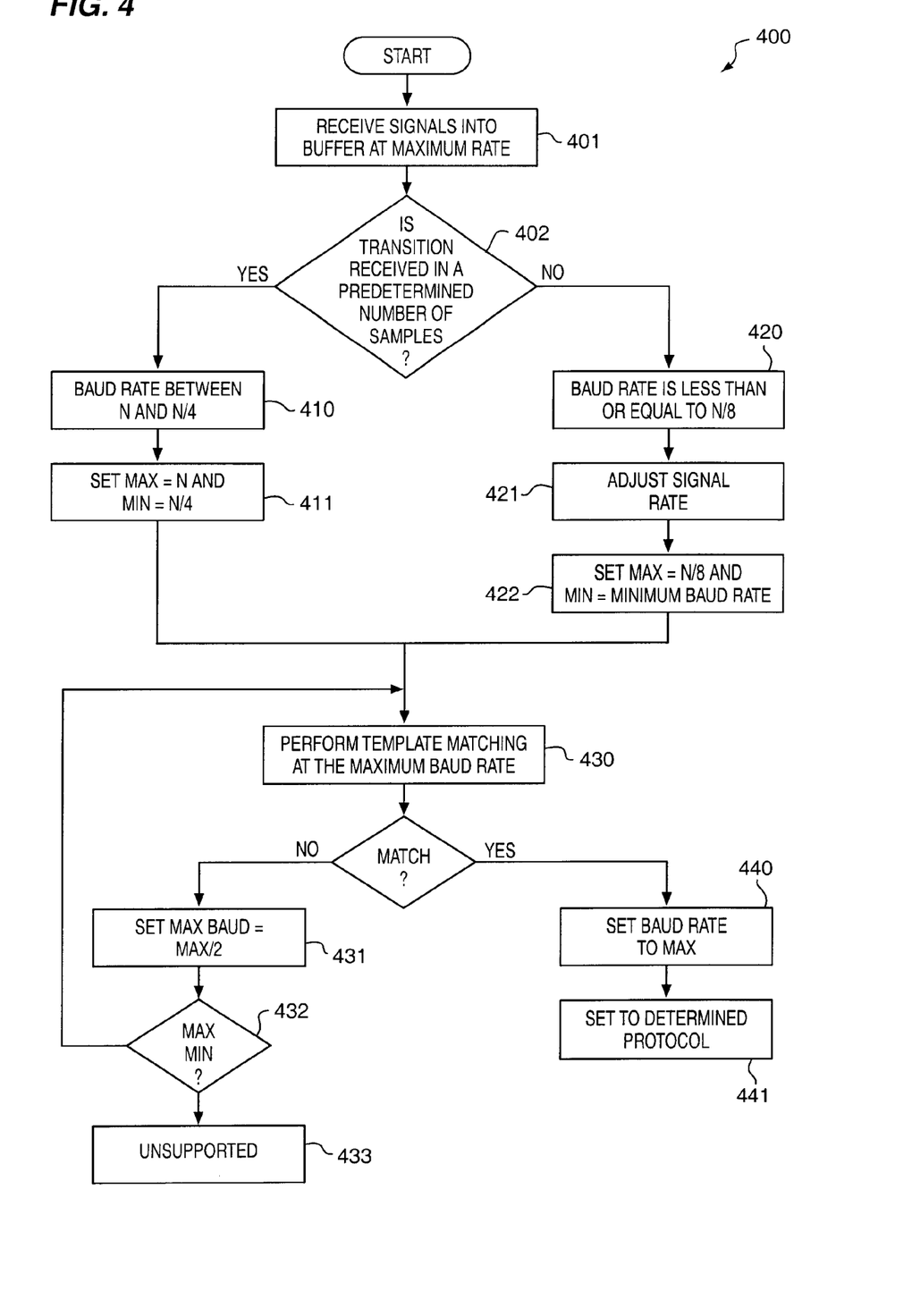
FIG. 4 illustrating a first exemplary embodiment of a process for setting Protocol parameters in accordance with the present invention.

FIG. 4 illustrates a process 400 which is an exemplary embodiment of a process for performing the steps of process 300 shown in FIG. 3. Process 400 begins in step 401 with receiving samples in buffer at a maximum rate. In step 402, the remote device determines whether a predetermined level transition between two bits occurs after a certain number of samples.

For example, the start bit is a known bit that indicates the beginning of a data frame in any frame or protocol. If a level transition between two signals is received in the certain number of samples, the remote device determines that the baud rate is between n (or the maximum baud rate) and n divided by 4 (n/4) in step 410. This is because a baud rate of n guarantees that a level transition between two bits cannot exist at baud rates less than or equal to n/8. Therefore, the maximum baud rate is set at n and minimum baud rate is set at n/4.

If a level transition between two bits is not detected in the predetermined number of samples in step 402, then the remote device determines that the baud rate is n/8 or less. In order to receive the needed signals the sample rate of signals is adjusted in step 421. This changes the amount of signals stored in the buffer. The maximum baud rate is then set at n/8 and the minimum is set to the minimum baud rate supported by the remote device in step 422.

After step 411 or step 422 which set the maximum and minimum baud rates, a routine for determining the exact Protocol Parameters is performed. This routine begins in step 430 in which template matching is executed for the maximum baud rate. In accordance with this invention, a template is a stored or generated file including expected transitions for particular samples. If the expected transition in the template match transitions in the file, the template matches.

Figure 5:
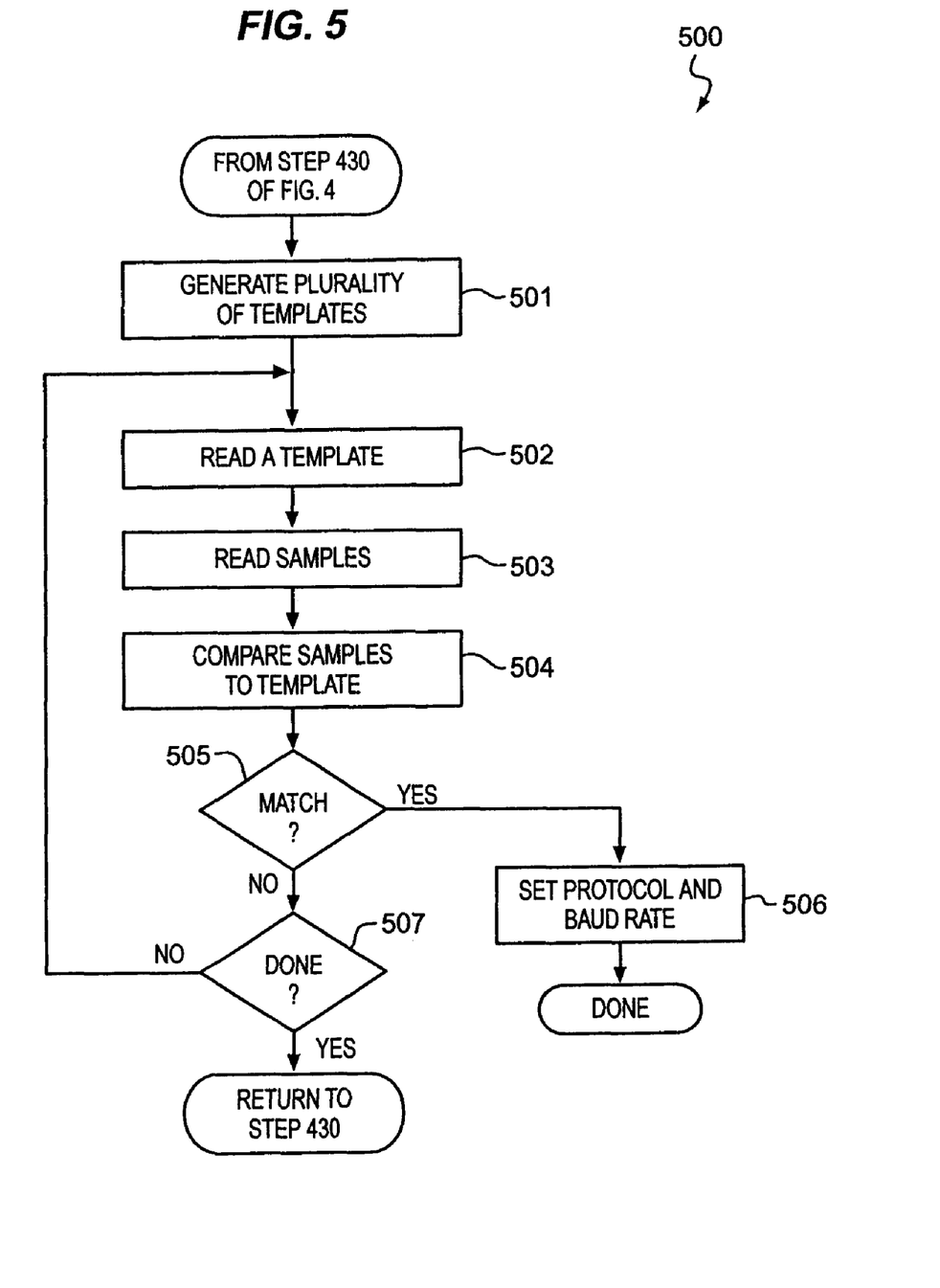
FIG. 5 illustrating an exemplary process for determining a protocol used based upon template matching.

An example of template matching performed in step 430 is illustrated in process 500 illustrated in FIG. 5. If a template for a protocol at the current baud rate matches the signals in the buffer, the baud rate for the remote device is set to the maximum baud rate in step 440 and the protocol and framing is set to the protocol of the matching template in step 441 and process 400 ends. If the protocol and baud rate are not determined in step 430, the maximum baud rate is set to the current maximum divided by two (Max/2) in step 431.

In step 432, the remote device determines whether the maximum baud rate is less than the minimum baud rate. If the maximum baud rate is less than the minimum baud rate then the remote device indicates that the Protocol Parameters are not supported by the remote device in step 432 and process 400 ends. Otherwise steps 430–432 are repeated using the new maximum baud rate.

FIG. 5 illustrates a process 500 which is an exemplary process of template matching performed in step 430 of process 400. Process 500 begins in step 501 with the remote device loading templates for the supported protocols at the current maximum baud rate. At this time the templates may either be generated or retrieved from a memory. In step 502, a template for the current maximum baud rate is read. In step 503, the signals stored in the buffer are read. The signals read from the buffer are compared to the read template in step 504. In step 505, it is determined whether the pattern of signals read from the buffer match the template of expected signals. It should be noted that the template only matches certain signals in each frame and does not match all points. This is because the frame contains data bits which cannot be matched reliably. Instead, the template attempts to match known bits such as start bits and stop bits.

If the signals do not match the template in step 505, the remote device determines whether there are other templates remaining to be compared in step 507. If there are more templates to compare, process 500 is repeated from step 502. If there are no more templates, process 500 ends. If the signals do match the template in step 505, the remote device sets the baud rate at the current maximum baud rate and the protocol to the protocol of the template being compared in step 506. Process 500 then ends.

Figure 6:
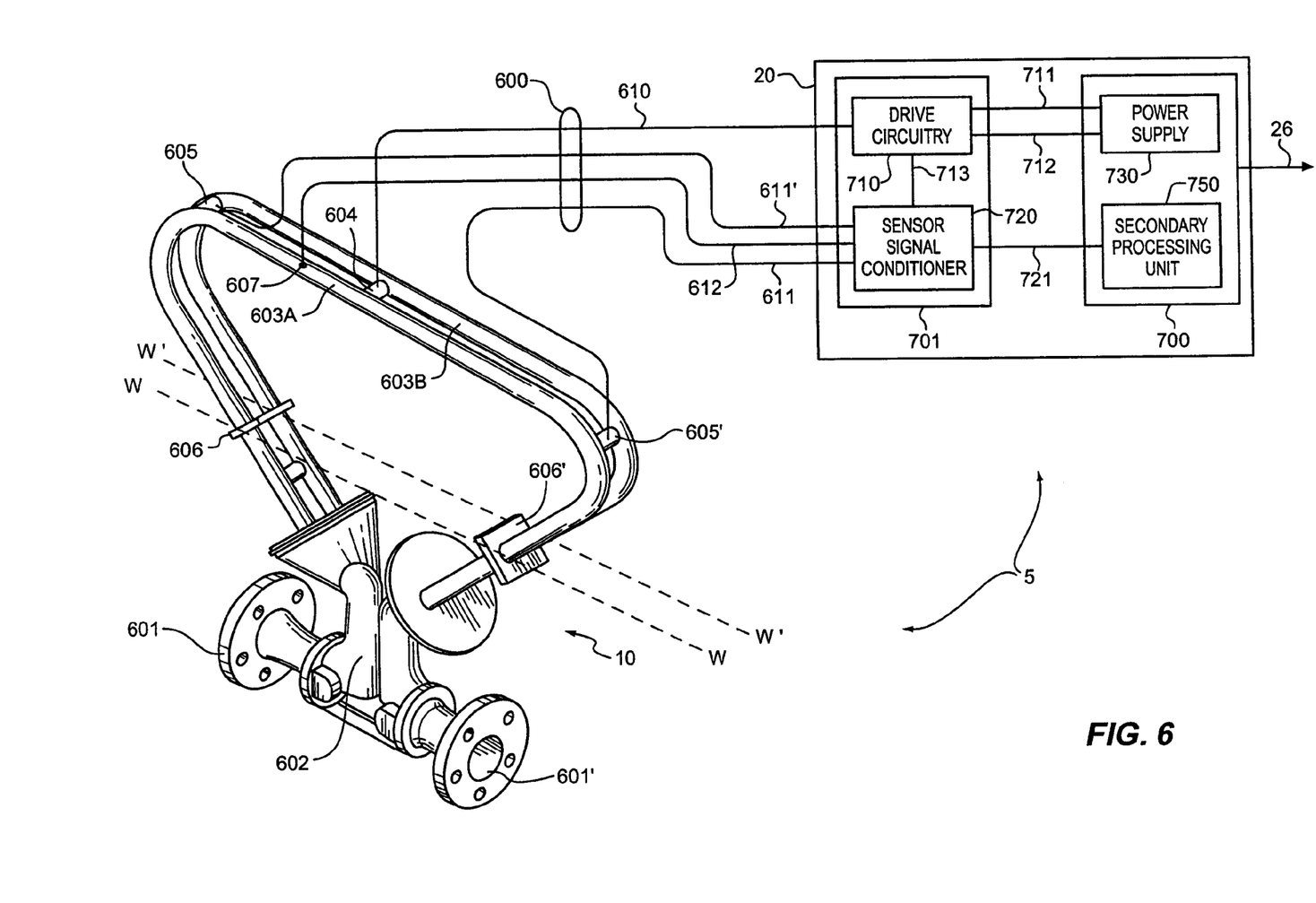
FIG. 6 illustrating an exemplary Coriolis flowmeter that has a signal conditioner that performs the setting of frames and protocol in accordance with this invention.

One type of device that has electronic components that can use the baud rate and protocol setting of this invention is a Coriolis flowmeter. FIG. 6 shows an exemplary Coriolis flowmeter 5 comprising a Coriolis flowmeter assembly 10 and meter electronics 20. Meter electronics 20 is connected to flowmeter assembly 10 via path 600 to provide density, mass flow rate, volume flow rate and totalized mass flow information over path 26. A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by a Coriolis mass flowmeters.

Meter assembly 10 includes a pair of flanges 601 and 601', manifold 602 and conduits 603A and 603B. Connected to conduits 603A and 603B are driver 604, pick-off sensors 605 and 605', and temperature sensor 607. Brace bars 606 and 606' serve to define the axis W and W' about which each conduit oscillates.

When Coriolis flowmeter 5 is inserted into a pipeline system (not shown) which carries the process material that is being measured, material enters flowmeter assembly 10 through flange 601, passes through manifold 602 where the material is directed to enter conduits 603A and 603B, flows through conduits 603A and 603B and back into manifold 602 from where it exits meter assembly 10 through flange 601'.

Conduits 603A and 603B are selected and appropriately mounted to the manifold 602 so as to have substantially the same mass distribution, moments of inertia and elastic modules about bending axes W—W and W'—W', respectively. The conduits 603A–603B extend outwardly from the manifold in an essentially parallel fashion.

Conduits 603A–603B are driven by driver 604 in opposite directions about their respective bending axes W and W' and at what is termed the first out of phase bending mode of the flowmeter. Driver 604 may comprise any one of many well known arrangements, such as a magnet mounted to conduit 603A and an opposing coil mounted to conduit 603B and through which an alternating current is passed for vibrating both conduits. A suitable drive signal is applied by meter electronics 20 to driver 604 via path 610.

Pick-off sensors 605 and 605' are affixed to at least one of conduits 603A and 603B on opposing ends of the conduit to measure oscillation of the conduits. As the conduit 603A–603B vibrates, pick-off sensors 605–605' generate a first pick-off signal and a second pick-off signal. The first and second pick-off signals are applied to paths 611 and 611'. The driver velocity signal is applied to path 610.

Meter electronics 20 receives the first and second pick-off signals appearing on paths 611 and 611', respectively. Meter electronics 20 processes the first and second velocity signals to compute the mass flow rate, the density, or other properties of the material passing through flowmeter assembly 10. This computed information is applied by meter electronics 20 over path 26 to a utilization means (not shown).

It is known to those skilled in the art that Coriolis flowmeter 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers.

Figure 7:
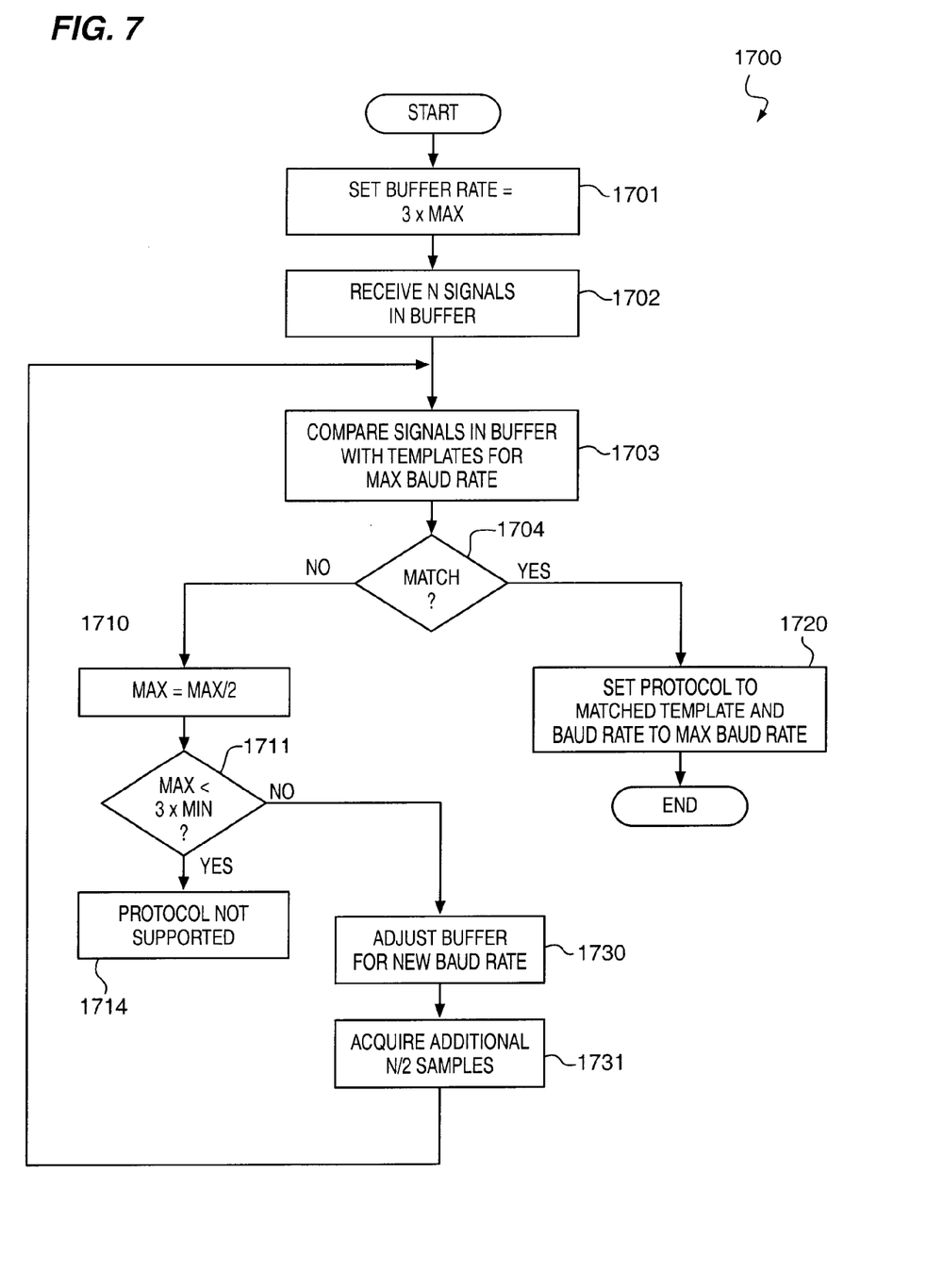
FIG. 7 illustrating a preferred exemplary embodiment of this invention executed by a signal conditioner in a Coriolis flowmeter.

In this invention, the meter electronics 20 are physically divided into 2 components; a host system 700 and a signal conditioner 701 that is remote from the host system 700. In conventional meter electronics, these components are housed in one unit.

Signal conditioner 701 includes drive circuitry 710 and pick-off conditioning circuitry 720. One skilled in the art will recognize that in actuality drive circuitry 710 and pick-off conditioning circuitry 720 may be separate analog circuits or may be separate functions provided by a digital signal processor or other digital components. Drive circuitry 710 generates a drive signal and applies the drive signal to driver 604 via path 610 of path 600. In actuality, path 610 is a first and a second lead. Drive circuitry 710 is communicatively connected to pick-off signal conditioning circuitry 720 via path 713. Path 713 allows drive circuitry to monitor the incoming pick-off signals to adjust the drive signal. Power to operate drive circuitry 710 and pick-off signal conditioning circuitry 720 is supplied from host system 700 via a first wire 711 and a second wire 712. First wire 711 and second wire 712 may be a part of a conventional 2-wire, 4-wire cable, or a portion of a multi-pair cable.

Pick-off signal conditioning circuitry 720 receives input signals from first pick-off 605, second pick-off 605', and temperature sensor 607 via paths 611, 611' and 612. Pick-off circuitry 720 determines the frequency of the pick-off signals and may also determine properties of a material flowing through conduits 603A–603B. After the frequency of the input signals from pick-off sensors 605–605' and properties of the material are determined, parameter signals carrying this information are generated and transmitted to a secondary processing unit 750 in host system 700 via path 721. In a preferred embodiment, path 721 includes 2 leads. However, one skilled in the art will recognize that path 721 may be carried over first wire 711 and second wire 712 or over any other number of wires.

Host system 700 includes a power supply 730 and processing system 750. Power supply 730 receives electricity from a source and converts the received electricity to the proper power needed by the system. Processing system 750 receives the parameter signals from pick-off signal conditioning circuitry 720 and then may perform processes needed to provide properties of the material flowing through conduits 603A–603B needed by a user. Such properties may include but are not limited to density, mass flow rate, and volumetric flow rate.

In this configuration, signal conditioner 701 is a remote device communicating with host system 700 which is the host device. Signal conditioner 701 determines the Protocol Parameters that host system 700 is using to communicate. Signal conditioner 701 then is set to communicate at the determined Protocol Parameters.

FIG. 7 illustrates a preferred exemplary process executed by signal conditioner 701 to detect the baud rate, determine the protocol and framing used and set the Protocol Parameters for communication in accordance with the present invention. Process 1700 begins in step 1701 by setting a sample rate for receiving signals into a buffer at 3 times the maximum baud rate support (3n). In step 1702, n signals are received into the buffer.

In step 1703, the template for the protocols supported for the maximum baud rate are compared to the signals stored in the buffer. The signal conditioner 701 determines whether one of the templates matches the signals in the buffer in step 1703. If the signals match a template, signal conditioner sets the protocol to the protocol of the template matched and sets the baud rate to the maximum baud rate in step 1720.

If the signals do not match any of the templates for the maximum baud rate, the maximum baud rate is set to the maximum baud rate divided by two (n/2) in step 1710. In step 1711, signal conditioner 701 determines whether the maximum baud rate is less than three times a minimum baud rate (3 min.). If the maximum baud rate is less than three times the minimum baud rate, process 1700 indicates that the protocol is not supported by signal conditioner 701 in step 1714.

If the maximum baud rate is not less than three times the minimum baud rate, the signal conditioner adjusts the buffer to match the new maximum baud rate in step 1730. An additional n divided by two samples are then acquired by the buffer in step 1731 and process 1700 is repeated from step 1703.

What is claimed is:

1. A method for a remote device to establish communication with a host device, the method comprising the steps of:
   receiving samples of signals from said host device in a buffer;
   detecting a baud rate of said signals from said samples;
   determining from said samples a protocol being used by said host device to communicate by performing protocol template matching between said samples and templates of known bits in supported protocols, said step of performing protocol template matching comprising:
      reading one of a plurality of protocol templates,
      reading said samples of said signals from said buffer,
      comparing said one of said plurality of protocol templates to said samples of said signals, and
      determining said signals are being transmitted in a protocol of said one of said plurality of protocol templates responsive to a match of said one of said plurality of protocol templates and said samples of said signals; and
   setting said remote device to communicate with said host device using said determined protocol at said detected baud rate.

2. The method of claim 1 wherein said step of detecting said baud rate comprises the step of:
   determining whether a level transition between two bits is received within a certain number of said samples.

3. The method of claim 2 wherein said step of detecting further comprises the step of:
   adjusting a sample rate responsive to said level transition between two bits not being received within said certain number of samples.

4. The method of claim 2 wherein said step of detecting further comprises the step of:
   determining said baud rate is less than or equal to n divided by 8 responsive to a determination that said level transition between two bits is not received within said certain number of said samples.

5. The method of claim 4 wherein said step of performing protocol template matching comprises the step of:
   performing said protocol template matching for baud rates of n divided 8 and less responsive to a determination that said baud rate is less than or equal to n divided by 8.

6. The method of claim 2 wherein said step of detecting further comprises the step of:
   determining said baud rate is between n and n/4 responsive to a determination that said level transition between two bits is not received within said certain number of said samples.

7. The method of claim 6 wherein said step of performing protocol template matching comprises the step of:
   performing said protocol template matching for baud rates between n and n/4.

8. An apparatus in a remote device for establishing communication with a host device, said apparatus comprising;
   means for receiving samples of signals from said host device;
   means for storing said samples;
   means for detecting a baud rate of said signals from said samples;
   means for determining from said samples a protocol being used by said host device to communicate by performing protocol template matching between said samples and templates of known bits in each supported protocol, said means for determining from said samples a protocol comprising:
      means for reading one of a plurality of protocol templates,
      means for reading said samples of said signals from said buffer,
      means for comparing said one of said plurality of protocol templates to said samples of said signals, and
      means for determining said signals are being transmitted in a protocol of said one of said plurality of protocol templates responsive to a match of said one of said plurality of protocol templates and said samples of said signals; and
   means for setting said remote device to communicate with said host system using said determined protocol at said detected baud rate.

9. The apparatus of claim 8 wherein said means for detecting said baud rate comprises:
   means for determining whether a level transition between two bits is received within a certain number of said samples.

10. The apparatus of claim 9 wherein said means for detecting further comprises:
    means for adjusting a sample rate responsive to said level transition between two bits not being received within said certain number of said samples.

11. The apparatus of claim 9 wherein said means for detecting further comprises:
    means for determining said baud rate is less than or equal to n divided by 8 responsive to a determination that said level transition between two bits is not received within said certain number of said samples.

12. The apparatus of claim 11 further comprising:
    means for performing said protocol template matching for baud rates of n divided 8 and less responsive to a determination that said baud rate is less than or equal to n divided by 8.

13. The apparatus of claim 9 wherein said means for detecting further comprises:
    means for determining said baud rate is n and n/4 responsive to a determination that said level transition between two bits is not received within said certain number of said samples.

14. The apparatus of claim 13 wherein said means for determining from said samples a protocol comprises:
    means for performing said protocol template matching for each supported baud rate between n and n/4.

15. A product that allows a remote device to establish communication with a host device, the product comprising:

a media readable by a processor to store instructions; and said instructions for directing said processor in said remote device to:

receive samples of signals from said host device, detect a baud rate of said signals from said samples, determine from said samples a protocol being used by said host device to communicate by performing protocol template matching between said samples and templates of known bits in each supported protocol, and set said remote device to communicate with said host device using said determined protocol at said detected baud rate;

said instructions perform said protocol template matching by directing said processor to:

read one of a plurality of protocol templates, read said samples of said signals from said buffer, compare said one of said plurality of protocol templates to said samples of said signals, and determine said signals are being transmitted in a protocol of said one of said plurality of protocol templates responsive to a match of said one of said plurality of protocol templates and said samples of said signals.

16. The product of claim 15 wherein said instructions to detect said baud rate comprise:

instructions for directing said processor to determine whether a level transition between two bits is received within a certain number of said samples.

17. The product of claim 16 wherein said instructions to detect said baud rate further comprise:

instructions for directing said processor to adjust a sample rate responsive to said level transition between two bits not being received within said certain number of said samples.

18. The product of claim 16 wherein said instructions to detect said baud rate further comprise:

instructions for directing said processor to determine said baud rate is less than or equal to n divided by 8 responsive to a determination that said level transition between two bits is not received within said certain number of said samples.

19. The product of claim 18 wherein said instructions to determine from said samples a protocol further comprise:

instructions for directing said processor to perform said protocol template matching for baud rates of n divided by 8 and less responsive to a determination that said baud rate is less than or equal to n divided by 8.

20. The product of claim 16 wherein said instructions to detect said baud rate further comprise:

instructions to determine said baud rate is between n and n/4 responsive to a determination that said level transition between two bits is not received within said certain number of said samples.

21. The product of claim 20 wherein said instructions to determine from said samples a protocol comprise:

instructions to perform said protocol template matching for each supported baud rate between n and n/4.

* * * * *

UNITED STATES PATENT AND TRADEMARK OFFICE
CERTIFICATE OF CORRECTION

PATENT NO. : 6,678,751 B1
DATED : January 13, 2004
INVENTOR(S) : Paul J. Hays and William M. Mansfield It is certified that error appears in the above-identified patent and that said Letters Patent is hereby corrected as shown below:

Column 1,
Line 27, replace "electronic devices to communicate the share data. The" with
-- electronic devices to communicate to share data. The --

Column 3,
Line 29, replace "performed for, patterns of protocols and framing for baud" with
-- performed for patterns of protocols and framing for baud --

Column 7,
Line 43, insert the following paragraph:
-- Temperature sensor 607 is affixed to at least one conduit 603A and/or 603B. Temperature sensor 607 measures the temperature of the conduit in order to modify equations for the temperature of the system. Path 612 carries temperature signals from temperature sensor 107 to meter electronics 20. --

Column 9,
Line 55, replace "of n divided 8 and less responsive to a determination" with -- of n divided by 8 and less responsive to a determination --

Column 10,
Line 52, replace "baud rates of n divided 8 and less responsive to a" with -- baud rates of n divided by 8 and less responsive to a --
Line 57, replace "means for determining said baud rate is n and n/4 respon-" with
-- means for determining said baud rate is between n and n/4 respon- --

Signed and Sealed this

Sixth Day of April, 2004

JON W. DUDAS
*Acting Director of the United States Patent and Trademark Office*